(12) United States Patent
Dong et al.

(10) Patent No.: US 10,467,048 B2
(45) Date of Patent: Nov. 5, 2019

(54) TECHNIQUES FOR VIRTUAL MACHINE MIGRATION

(71) Applicant: Intel Corporation, Santa Clara, CA (US)

(72) Inventors: Yao Zu Dong, Shanghai (CN); Kun Tian, Shanghai (CN)

(73) Assignee: INTEL CORPORATION, Santa Clara, CA (US)

( * ) Notice: Subject to any disclaimer, the term of this patent is extended or adjusted under 35 U.S.C. 154(b) by 114 days.

(21) Appl. No.: 15/577,041

(22) PCT Filed: Jun. 26, 2015

(86) PCT No.: PCT/CN2015/000465
§ 371 (c)(1),
(2) Date: Nov. 27, 2017

(87) PCT Pub. No.: WO2016/205978
PCT Pub. Date: Dec. 29, 2016

(65) Prior Publication Data
US 2018/0136971 A1    May 17, 2018

(51) Int. Cl.
*G06F 9/48*    (2006.01)
*G06F 9/455*   (2018.01)

(52) U.S. Cl.
CPC ........ *G06F 9/4856* (2013.01); *G06F 9/45558* (2013.01); *G06F 2009/4557* (2013.01); *G06F 2009/45583* (2013.01)

(58) Field of Classification Search
None
See application file for complete search history.

(56) References Cited

U.S. PATENT DOCUMENTS

| | | |
|---|---|---|
| 2009/0222558 A1 | 9/2009 | Xu et al. |
| 2010/0325268 A1 | 12/2010 | Muthiah et al. |
| 2011/0302577 A1 | 12/2011 | Reuther et al. |
| 2014/0115164 A1* | 4/2014 | Kalyanaraman ............ H04L 29/08954 709/226 |
| 2015/0095909 A1 | 4/2015 | Li et al. |
| 2015/0149999 A1* | 5/2015 | Ramanathan ......... G06F 9/4856 718/1 |
| 2015/0160972 A1* | 6/2015 | Yu ......................... G06F 9/4856 718/1 |
| 2015/0169239 A1 | 6/2015 | Sakai |

(Continued)

FOREIGN PATENT DOCUMENTS

| | | |
|---|---|---|
| CN | 102929715 | 2/2013 |
| CN | 104156255 | 11/2014 |

OTHER PUBLICATIONS

European Search Report for the European Patent Application No. 15895878, dated Jan. 8, 2019.

(Continued)

*Primary Examiner* — Philip Wang

(57) ABSTRACT

Examples may include techniques for virtual machine (VM) migration. Examples may include selecting a VM for live migration from a source node to a destination node, predicting a time period associated with the live migration, and selecting another VM from which allocated source node bandwidth may borrowed to facilitate the live migration within the predicted time.

25 Claims, 9 Drawing Sheets

(56) References Cited

U.S. PATENT DOCUMENTS

2016/0380909 A1* 12/2016 Antony ................. H04L 47/722
                                                        370/236
2017/0353433 A1* 12/2017 Antony ................... H04L 49/70
2018/0024854 A1*  1/2018 Wang .................... G06F 9/5088
                                                          718/1
2018/0088975 A1*  3/2018 Kaul ................... G06F 9/45558

OTHER PUBLICATIONS

International Search Report and Written Opinion received for PCT Patent Application No. PCT/CN2015/000465, dated Mar. 22, 2016, 11 pages.

* cited by examiner

Comparison 500

| VM | Allocated BW (MBps) | QoS/SLA Req'd BW (MBps) | Borrowed BW (MBps) | Throughput Reduced (MBps) | Predicted Time (sec) | Total Penalty (USD) | Rank |
|---|---|---|---|---|---|---|---|
| 112-2 | 1,600 | 1200 | 800 | 400 | 0.5 | $0.2 | #4 |
| 112-3 | 1000 | 900 | 800 | 700 | 0.5 | $0.35 | #1 |
| 112-4 | 1500 | 900 | 800 | 600 | 0.5 | $0.3 | #2 |
| 112-5 | 1100 | 800 | 800 | 500 | 0.5 | $0.25 | #3 |
| 112-6 | 800 | 0 | 800 | 0 | 0.5 | 0 | #5 |

IDENTIFY A FIRST VM FROM AMONG A PLURALITY OF VMS HOSTED BY A SOURCE NODE FOR LIVE MIGRATION TO A DESTINATION NODE, THE PLURALITY OF VMS SEPARATELY ALLOCATED SOURCE NODE NETWORK BANDWIDTH FOR EXECUTING A RESPECTIVE APPLICATION TO FULFILL A RESPECTIVE WORKLOAD
702

DETERMINE A PREDICTED TIME PERIOD FOR THE FIRST VM, EXECUTING A FIRST APPLICATION, TO COPY DIRTY PAGES OF MEMORY TO THE SOURCE NODE UNTIL A THRESHOLD NUMBER OF DIRTY MEMORY PAGES IS REACHED, THE PREDICTED TIME PERIOD BASED ON THE FIRST VM EXECUTING THE FIRST APPLICATION TO FULFILL A FIRST WORKLOAD
704

SELECT A SECOND VM FROM AMONG THE PLURALITY OF VMS TO BORROW ALLOCATED SOURCE NODE NETWORK BANDWIDTH FOR THE FIRST VM TO COMPLETE THE LIVE MIGRATION TO THE DESTINATION NODE WITHIN THE PREDICTED TIME PERIOD
706

FIG. 7

Storage Medium 800

Computer Executable
Instructions for 700

TECHNIQUES FOR VIRTUAL MACHINE MIGRATION

CROSS-REFERENCE TO RELATED APPLICATIONS

This application is a national phase claiming the benefit of and priority to International Patent Application No. PCT/CN2015/000465, entitled "TECHNIQUES FOR VIRTUAL MACHINE MIGRATION", filed Jun. 26, 2015, which is hereby incorporated by reference in its entirety.

TECHNICAL FIELD

Examples described herein are generally related virtual machine (VM) migration between nodes in a network.

BACKGROUND

Live migration for virtual machines (VMs) hosted by nodes/servers is an important feature for a system such as a data center to enable fault-tolerance capabilities, flexible resource management or dynamic workload rebalancing. Live migration may include migrating a VM hosted by a source node to a destination node over a network connection between the source and destination node. The migration may be considered as live since an application being executed by the migrated VM may continue to be executed by the VM during most of the live migration. Execution may only be briefly halted just prior to copying remaining state information from the source node to the destination node to enable the VM to resume execution of the application at the destination node.

BRIEF DESCRIPTION OF THE DRAWINGS

FIG. 5 illustrates an example comparison.
FIG. 7 illustrates an example of a logic flow.
FIG. 8 illustrates an example of a storage medium.

DETAILED DESCRIPTION

Figure 1:
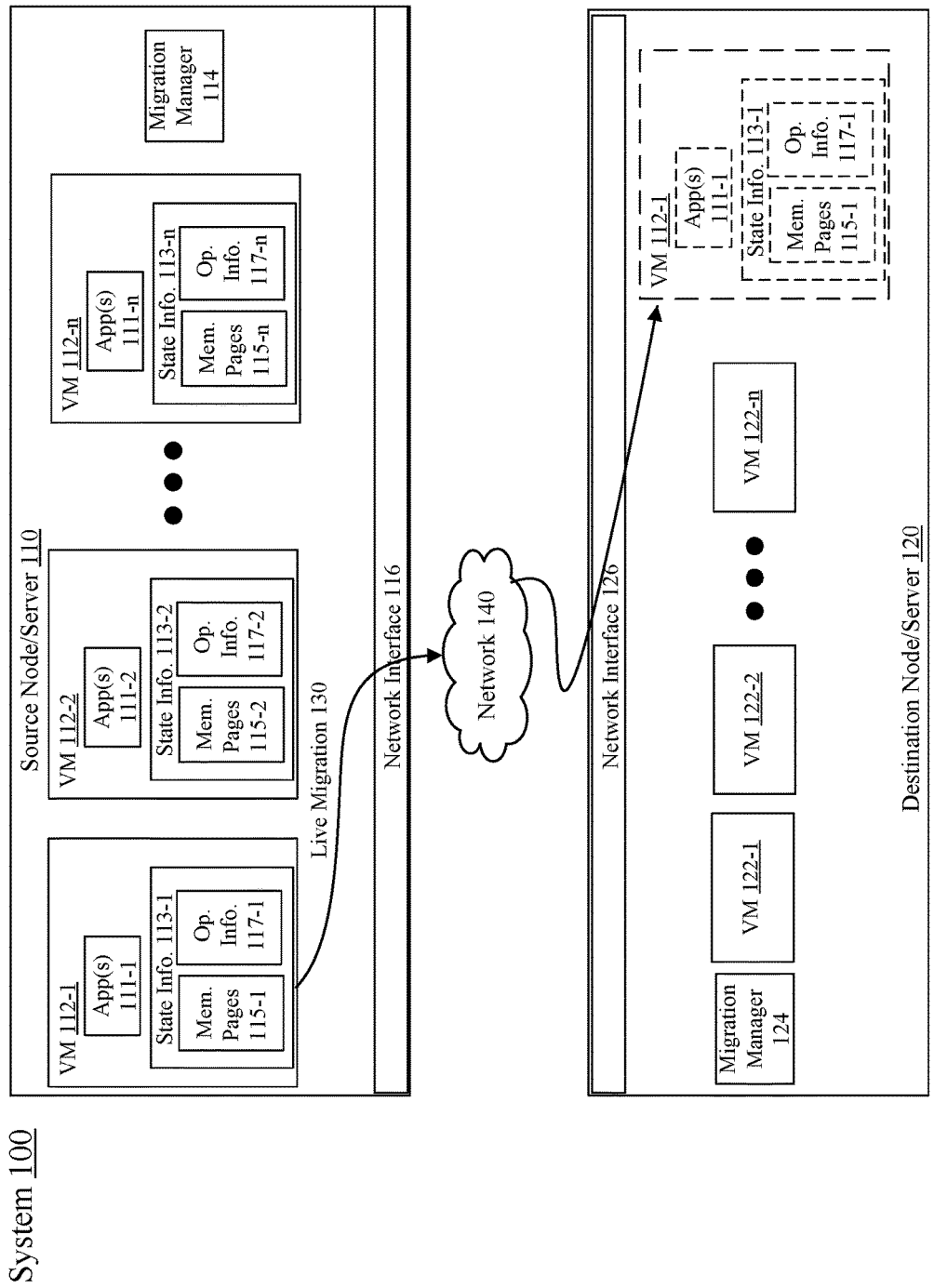
FIG. 1 illustrates an example system.

As contemplated in the present disclosure, live migration of a VM from a source node/server to a destination node/server may be considered as live as the application being executed by the VM may continue to be executed by the VM during most of the live migration. A large portion of a live migration of a VM may be VM state information that includes memory used by the VM while executing the application. Therefore, VM live migration typically involves a two-phase process. The first phase may be a pre-memory copy phase that includes copying initial memory (e.g., for a $1^{st}$ iteration) and changing memory (e.g., dirty pages) for remaining iterations from the source node to the destination node while the VM is still executing the application or the VM is still running on the source node. The first or pre-memory phase may continue until remaining dirty pages at the source node fall below a threshold. The second phase may then be a stop-and-copy phase that stops or halts execution of the application by the VM at the source node, copies remaining state information (e.g., remaining dirty pages and/or processor state, input/output state) to the destination node, and then resumes execution of the application by the VM at the destination node. The copying of VM state information for the two phases may be through a network connection maintained between the source and destination node.

The amount of time spent in the second, stop-and-copy phase is important as the application is not being executed by the VM for this period of time. Thus, any network services being provided while executing the application may be temporarily unresponsive. The amount of time spent in the first pre-memory copy phase is also important since this phase may have the greatest time impact on the overall time to complete the live migration.

A significant challenge to VM migration may be associated with a memory working set of the VM as the VM executes one or more applications. If a rate of dirtied memory pages is larger than a rate of an allocated source node network bandwidth for the VM migration then it may take an unacceptably long time to halt execution of the one or more applications at the stop-and-copy phase as a large amount of data may still remain to be copied from the source node to the destination node. This unacceptably long time is problematic to VM migration and may lead to a migration failure.

One way to reduce live VM migration times is to increase the allocated source node network bandwidth for the VM migration. However, source node network bandwidth may be limited and wise use of this limited resource may be necessary to meet various performance requirements associated with quality of service (QoS) criteria or service level agreements (SLAs) that may be associated with operating a data center. Selectively choosing which VM to migrate and also possibly the time of day for such migration may enable a more efficient use of valuable allocated network bandwidth and may enable a live VM migration that has an acceptably short time period for a stop-and-copy phase. Also, additional source node resources such processing resources may be tied or allocated during a migration and the longer these resources are allocated the greater an impact on overall performance for the source node and possibly the destination node as well. It is with respect to these challenges that the examples described herein are needed.

FIG. 1 illustrates an example system 100. In some examples, as shown in FIG. 1, system 100 includes a source node/server 110 that may be communicatively coupled with a destination node/server 120 through a network 140. Source node/server 110 and destination node/server 120 may be arranged to host a plurality of VMs. For example, source node/server 110 may host VMs 112-1, 112-2 to 112-n, where "n" is any whole positive integer greater than 2. Destination node/server 120 may also be capable of hosting VIVIs 122-1, 122-2 or 122-n. Hosting may include providing composed physical resources such as processors, memory, storage or network resources (not shown) maintained at or accessible to respective source node/server 110 or destination node/server 120. Both source node/server 110 and destination node/server 120 may include respective migration managers 114 and 124 to facilitate migration of VMs between these nodes. Also, in some examples, system 100 may be part of a data center arranged to provide Infrastructure as a Service (IaaS), Platform as a Service (PaaS) or Software as a Service (SaaS).

In some examples, as shown in FIG. 1, VMs 112-1, 112-2 and VM 122-n may be capable of executing respective one or more applications (App(s)) 111-1, 111-2 and 111-n.

Respective state information 113-1, 113-2 and 113-*n* for App(s) 111-1, 111-2 and 111-*n* may reflect a current state of respective VMs 112-1, 112-2 and VM 122-*n* for executing these one or more applications in order to fulfill a respective workload. For example, state information 113-1 may include memory pages 115-1 and operating information 117-1 to reflect the current state of VM 112-1 while executing App(s) 111-1 to fulfill a workload. The workload may be a network service associated with providing IaaS, PaaS or SaaS to one or more clients of a data center that may include system 100. The network service may include, but is not limited to, database network service, website hosting network services, routing network services, e-mail network services or virus scanning network services. Performance requirements for providing an IaaS, a PaaS or a SaaS to the one or more clients may include meeting one or more quality of service (QoS) criteria or service level agreement (SLAs).

In some examples, logic and/or features at source node/server 110 such as migration manager 114 may be capable of selecting a VM for live migration. The selection may be due to an inability of source node/server 110 to meet QoS criteria or SLAs when hosting VM 112-1 that may result in a need to rebalance resource usage between source node/server 110 and destination node/server 120. Examples are not limited to these reasons for a live migration. Other example reasons for a live migration are contemplated by this disclosure.

According to some examples, migration manager 114 may include logic and/or features to implement prediction algorithms to determine a predicted time for a VM to copy dirty memory pages to destination node/server 120 until remaining dirty memory pages fall below a threshold number (e.g., similar to completing a pre-memory copy phase). The predicted time period may be based on the selected VM executing the application to fulfill a workload. For example, as shown in FIG. 1, a live migration 130 may include migrating VM 112-1 to destination node/server 120 over network 140 and the predicted time period may be an amount of time until remaining dirty memory pages from memory pages 115-1 fall below the threshold number. The predicted time period may also be based on VM 112-1 executing App(s) 111-1 to fulfill the workload that may follow a predicted or predetermined workload pattern for the rate of generation of dirty memory pages from memory pages 115-1.

In some examples, as shown in FIG. 1, live migration 130 may be routed through network interface 116 at source node/server 110, over network 140 and then through network interface 126 at destination node/server 120. For these examples, network 140 may be part of an internal network for a data center that may include system 100. As described more below, a certain amount of allocated source node bandwidth from a limited amount of available bandwidth maintained by or available to source node/server 110 may be needed to enable live migration 130 to be completed in an acceptable amount of time through network 140. Some or all of that allocated bandwidth may be pre-allocated for supporting VM migration or some or all of that allocated bandwidth may be borrowed from other VMs hosted by source node/server 110.

According to some examples, the threshold number for the remaining dirty pages to be copied to destination node/server 120 may be based on an ability of source/node server 110 to copy to destination node/server 120 remaining dirty pages from memory pages 115-1 and copy at least processor and input/output states included in operation information 117-1 within a shutdown time threshold (e.g., similar to a stop-and-copy phase) utilizing an allocated source node bandwidth allocated by source node/server 110 for live migration 130. The shutdown time threshold may be based on a requirement for VM 112-1 to stop executing App(s) 111-1 at source node/server 110 and begin or resume executing App(s) 111-1 at destination node/server 120 within a given time period. The requirement for VM 112-1 to stop executing App(s) 111-1 and resume at destination node/server 120 within the shutdown time threshold may be set for meeting one or more QoS criteria or an SLA. For example, the requirement may dictate a shutdown time threshold of less than a couple milliseconds.

In some examples, migration manager 114 may also include logic and/or features to select a VM from among a plurality of VMs to borrow allocated source node network bandwidth for VM 112-1 to copy dirty memory pages to destination node/server 120 until remaining dirty memory pages fall below the threshold number within the predicted time period. For these examples, VMs 112-1, 112-2 to 112-*n* may each be allocated a portion of source node/server 110's network bandwidth. As described more below, migration manager 114 may be capable of determining individual penalties to VMs 112-2 to 112-*n* and then comparing the individual penalties to determine which VM has a lowest penalty for providing the borrowed allocated source node bandwidth for use by VM 112-1 for live migration 130. The VM having the lowest penalty may then be selected as the VM for which the source node network bandwidth is borrowed for use in live migration 130. The borrowed amount of allocated source node network bandwidth may include all or at least a portion of the selected VMs allocated source node network bandwidth.

Figure 2:
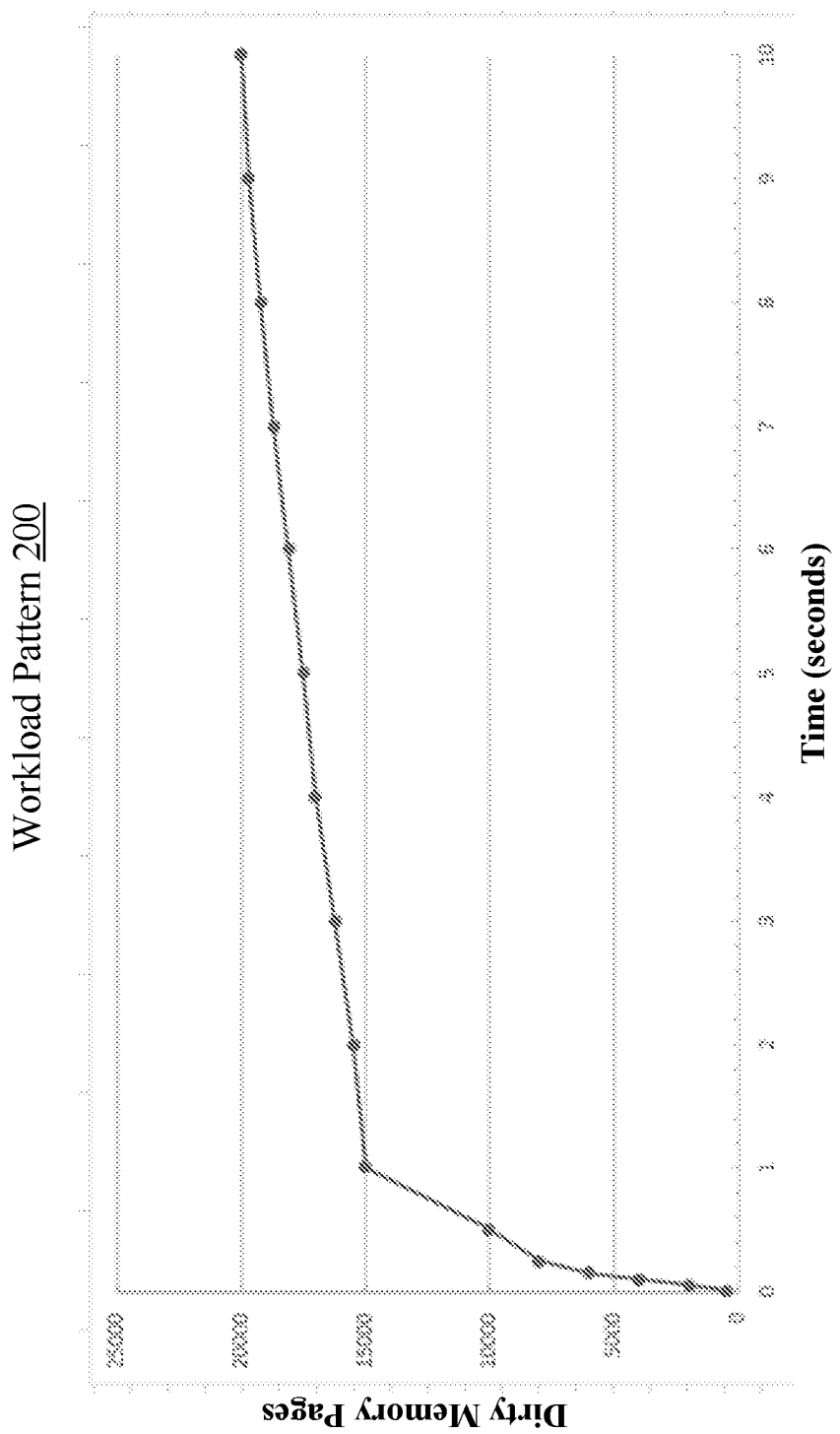
FIG. 2 illustrates an example workload pattern.

FIG. 2 illustrates an example workload pattern 200. In some examples, workload pattern 200 may be based on collecting a writable (memory) working-set pattern using a log-dirty mode to track a number of dirty memory pages over a given time. The use of the log-dirty mode may be used to track dirty pages during a previous iteration that may occur during a live VM migration. In other words, as dirty pages are being copied from a source node to a destination node, new dirty pages generated during this period or iteration may be generated. The log-dirty mode may set write-protection to memory pages for the VM and set a data structure (e.g., a bitmap, hash table, log buffer or page modification logging) to indicate a dirty status of a given memory page at a time of fault (e.g., VM exit in system virtualization), when the VM writes to the given memory page. Following the write to the given memory page, the write-protection is removed for the given memory page. The data structure may be checked periodically (e.g., every 10 milliseconds) to determine a total number of dirty pages.

In some examples, as shown in FIG. 2 for workload pattern 200, following an initial burst in the number of dirty memory pages at the start, the rate of dirty memory page generation somewhat levels off. According to some examples, the generation of dirty memory pages by a workload pattern such a workload pattern 200 may be described using example equation 1:

$$D=f(t) \qquad (1)$$

For example equation 1, D represents dirty memory pages generated and f(t) represents a monolithically increasing function. Therefore, eventually all memory provisioned to a VM for executing an application that fulfills a workload having workload pattern 200 would go from 0 dirty memory pages to substantially all provisioned memory pages being dirty.

In some examples, an assumption may be made that D=f(t) for workload patterns may remain constant during a live VM migration process. Therefore, a workload pattern having D=f(t) that was tracked during a previous iteration may be the same for a current iteration. Even if a workload may fluctuate during a given 24-hour day, resampling or tracking of the workload to determine workload patterns reflecting fluctuating workloads may be needed. For example, tracking may occur every 30 minutes or every hour to determine what D=f(t) will apply for use in migrating the VM. For example, if a workload is high for a first portion of a 24-hour day compared to a second portion of a 24-hour day, more dirty memory pages may be generated for each iteration and thus live migration of a VM may need to account for this increase in the rate of dirty memory page generation.

Figure 3:
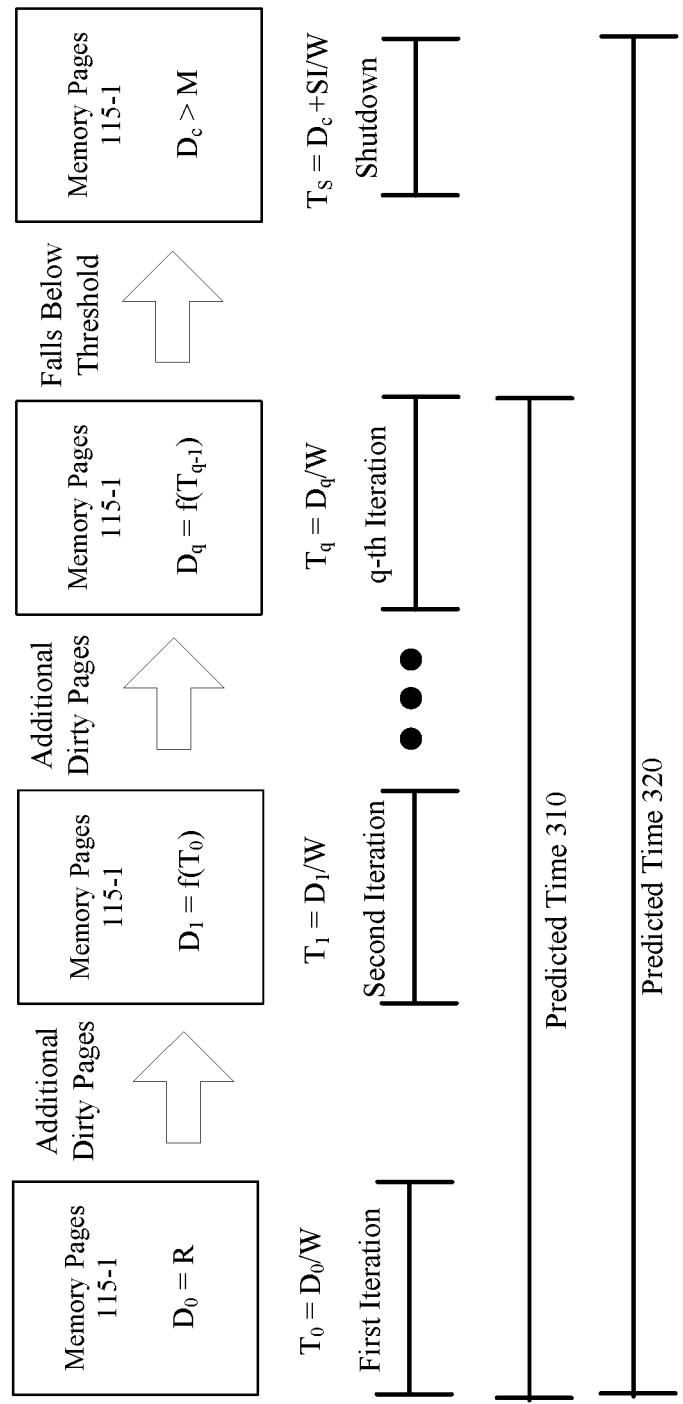
FIG. 3 illustrates an example scheme.

FIG. 3 illustrates an example scheme 300. In some examples, scheme 300 may depict a live VM migration that includes multiple copy iterations that may be needed to copy dirty memory pages from VM 112-1 of source node/server 110 to destination node/server 120 as part of live migration 130 shown in FIG. 1. For these examples, all memory pages provisioned to VM 112-1 to execute App(s) 111-1 for fulfilling a workload may be represented by "R". As shown in FIG. 3 for the start of first iteration of scheme 300 all R memory pages may be considered as dirty as represented by example equation (2) of $D_0=R$. In other words, according to example equation (2) and as shown in FIG. 3, all R memory pages may be copied to destination node/server 120 during the first iteration.

According to some examples, a time period to complete the first iteration may be determined using example equation (3):

$$T_0=D_0/W \quad (3)$$

For example equation (3), W may represent allocated source node bandwidth (e.g., in megabytes per second (MBps)) to be used to migrate VM 112-1 to destination node/server 120.

At the start of the second iteration, newly generated dirty pages produced by VM 112-1 executing App(s) 111-1 while fulfilling the workload during $T_0$ may be represented by example equation (4):

$$D_1=f(T_0) \quad (4)$$

The time period to copy $D_1$ dirty memory pages may be represented by example equation (5):

$$T_1=D_1/W \quad (5)$$

Therefore, the number of dirty memory pages at the start of the q-th iteration, where "q" is any positive whole integer >1, may be represented by example equation (6):

$$D_q=f(T_{q-1}) \quad (6)$$

The time period to copy Dq dirty memory pages may be represented by example equation (7):

$$T_q=D_q/W \quad (7)$$

In some examples, M may represent a threshold number of remaining dirty memory pages remaining at source node/server 110 that may trigger an end of a pre-memory copy phase and a start of a stop-and-copy phase that includes stopping execution of App(s) 111-1 by VM 112-1 at source node/server 110 and then copying remaining dirty memory pages of memory 115-1 as well as operating state information 117-1 to destination node/server 120. For these examples, equation (8) represents a condition of convergence for which the number of remaining dirty memory pages falls below M:

$$\exists i \; D_i \; M \quad (8)$$

Therefore, the number of remaining dirty pages at convergence may be represented by Dc and example equation (9) of $D_c<M$ indicates that the number of remaining dirty pages has fallen below the threshold number of M.

The time period to copy Dc during the stop-and-copy phase may be represented by example equation (10):

$$T_S=(D_c+SI)/W \quad (10)$$

For example equation (10), SI represents the operating state information included in operating state information 117-1 for VM 112-1 that existed at the time that execution of App(s) 111-1 was stopped at source node/server 110.

According to some examples, predicted time 310 as shown in FIG. 3 indicates the amount of time for the remaining dirty memory pages to fall below the threshold number of M. As shown in FIG. 3, this includes a summation of time periods $T_0$, $T_1$ to Tq. Predicted time 320, as shown in FIG. 3 indicates a total time to migrate VM 112-1 to destination node/server 120. As shown in FIG. 3, this includes a summation of time periods $T_0$, $T_1$ to Tq and $T_S$.

In some examples, threshold M may be based on an ability of VM 112-1 to stop executing App(s) 111-1 at source node/server 110 and begin executing App(s) 111-1 at destination node/server 120 within a shutdown time threshold based on using an allocated source node network bandwidth W for the live migration of VM 112-1.

In some examples, all of the allocated source node network bandwidth W may be borrowed from another VM hosted by source node/server 110. In other examples, a first portion of the allocated source node bandwidth W may include pre-allocated source node network bandwidth reserved for live migration (e.g., for any VM hosted by source node/server 110) and a second portion may include borrowed allocated source node network bandwidth borrowed from another VM hosted by source node/server 110.

In some examples, the shutdown time threshold may be based on a requirement for VM 112-1 to stop executing App(s) 111-1 at source node/server 110 and begin executing App(s) 111-1 at destination node/server 120 within a given time period. For these examples, the requirement may be set for meeting one or more QoS criteria or an SLA.

Figure 4:
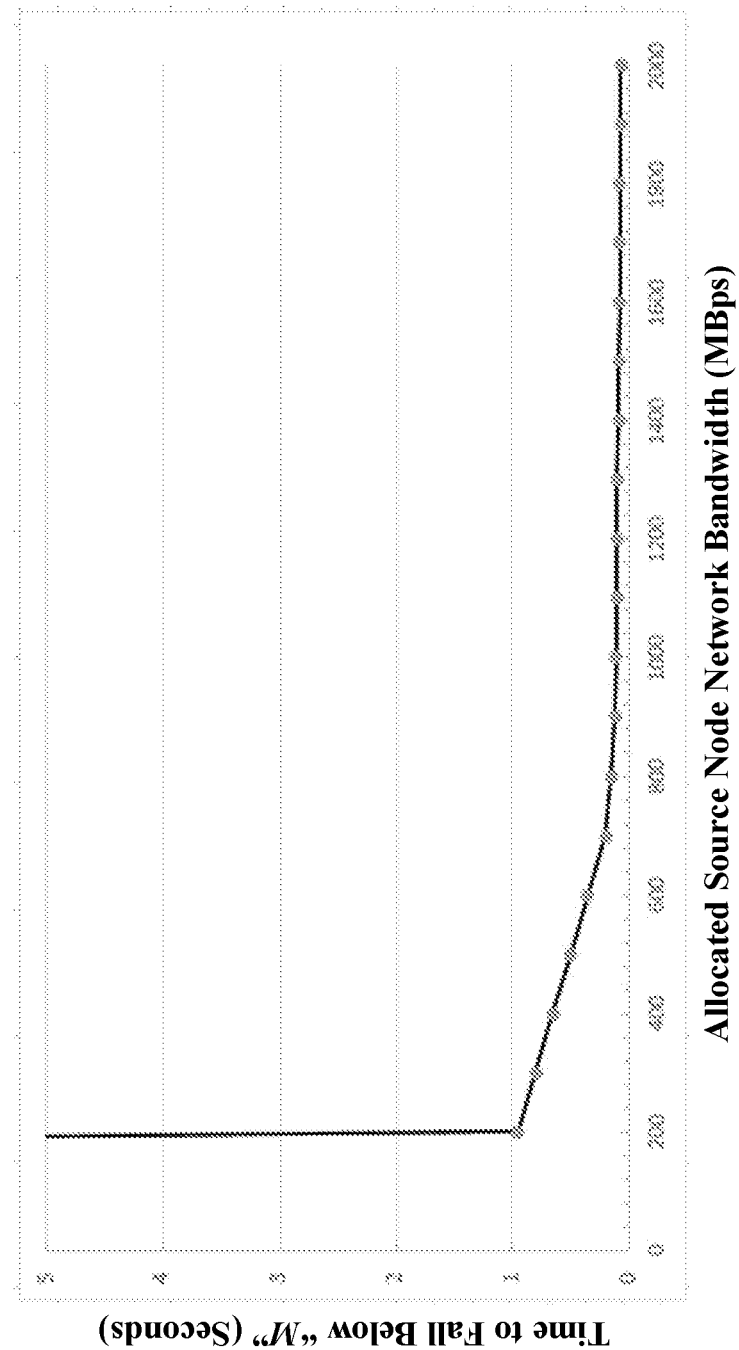
FIG. 4 illustrates an example prediction chart.

FIG. 4 illustrates an example prediction chart 400. In some examples, prediction chart 400 may show predicted times to fall below M number of remaining memory pages based on what allocated source node network bandwidth is used for live migration of a VM. Prediction chart 400, for example, may be based on use of example equations (1) through (9) using various different values for allocated source node network bandwidth and also based on a VM executing one or more applications to fulfill a workload having a workload pattern that determines D=f(t).

As shown in FIG. 4 for prediction chart 400, convergence (time to fall below M) in under 5 seconds does not appear to occur until at least 200 MBps is allocated for migration of the VM. Also at allocated source node network bandwidths of over 800 MBps no appreciable time benefits associated with allocating more bandwidth is shown.

According to some examples, prediction chart 400 may be used to determine what allocated source node network bandwidth could be best used for migrating a VM for a source node to a destination node. For these examples, once an allocated source node network bandwidth is selected, the sources for obtaining the allocated source node network bandwidth may be sought that include borrowing at least some source node network bandwidth from other VMs hosted by the source node.

FIG. 5 illustrates an example penalty comparison 500. In some examples, as shown in FIG. 5, penalty comparison 500 may include a listing of assigned penalties for VMs 112-2 to 112-6 for comparison to determine which VM has the lowest penalty for providing borrowed allocated source node network bandwidth for migrating VM 112-1 from source node/server 110 to destination node/server 120. For these examples, a total of $N_0$ source node network bandwidth is available for allocation to VMs 112-1 to 112-6 for these VMs to execute their respective App(s) to fulfill respective workloads. Example equation (11) depicts that each of these VMs may be assigned network bandwidth Ni:

$$N_0 = \Sigma_{i=1}^{16} N_i \qquad (11)$$

In some examples, the amount of source node network bandwidth allocated to each VM may be adequate to meet one or more QoS criteria or an SLA—if applicable. As a result, higher penalties may be incurred by VMs loaning a higher portion of their allocated source node network bandwidth. Comparison 500 indicates that VMs 112-3 and 112-5 may incur the highest penalties since these VMs will loan out all of their respective allocated source node network bandwidth. Comparison 500 also shows that VMs having some allocated source node network bandwidth left over such as VMs 112-2, 112-4 and 112-6 may thus may incur lower or reduced penalties. Penalties may be based on example equation (12):

$$\text{Total Penalty} = P_i(w) T_j(w) \qquad (12)$$

For example equation (12), w may represent the portion of allocated source node network bandwidth that is borrowed that may cause a penalty for VM i, Pi(w) may represent a penalty policy (e.g., 0.001 US Dollar/second penalty per 1 MBps reduced throughput for meeting QoS/SLA required throughput) for borrowing bandwidth W, and Tj(w) may represent a predicted time for VM j to be migrated from source node/server 110 to destination node/server 120 using the borrowed source node network bandwidth. For example, VM 112-2 has 800 of its 1,600 MBps allocated source node network bandwidth borrowed for a predicted time of 0.5 seconds to migrate VM 112-1 to destination node/server 120. VM 112-2 also has a QoS/SLA requirement needing 1200 MBps. So by loaning the 800 MBps, VM 112-2 only has 800 MBps remaining to meet the 1200 MBps QoS/SLA requirement and thus has a reduced throughput of 400 MBps. For a penalty policy of 0.001 US Dollar/second penalty per 1 MBps reduced throughput the resulting penalty would be 0.001×400×0.5 seconds or a $0.2 penalty.

In some examples, selection of which VM to lend allocated source node network bandwidth may be based on which VM incurred a least or lowest penalty. For comparison 500 that would be VM 112-6 because this VM is not subject to a QoS/SLA requirement and thus incurs no financial penalty is thus has the lowest ranking of #5. However, if VM 112-6 was subject to a QoS/SLA requirement it likely would have a relatively high penalty since all of its allocated source node network bandwidth would be borrowed from VM 112-1.

Examples for determining comparative penalties incurred by VMs loaning allocated source node network bandwidth to another VM for migration are not limited to those described for comparison 500 as shown in FIG. 5 or to the use of example equation (12). Other comparisons to determine which VMs incur higher or lower penalties for loaning allocated source node network bandwidth are contemplated.

Figure 6:
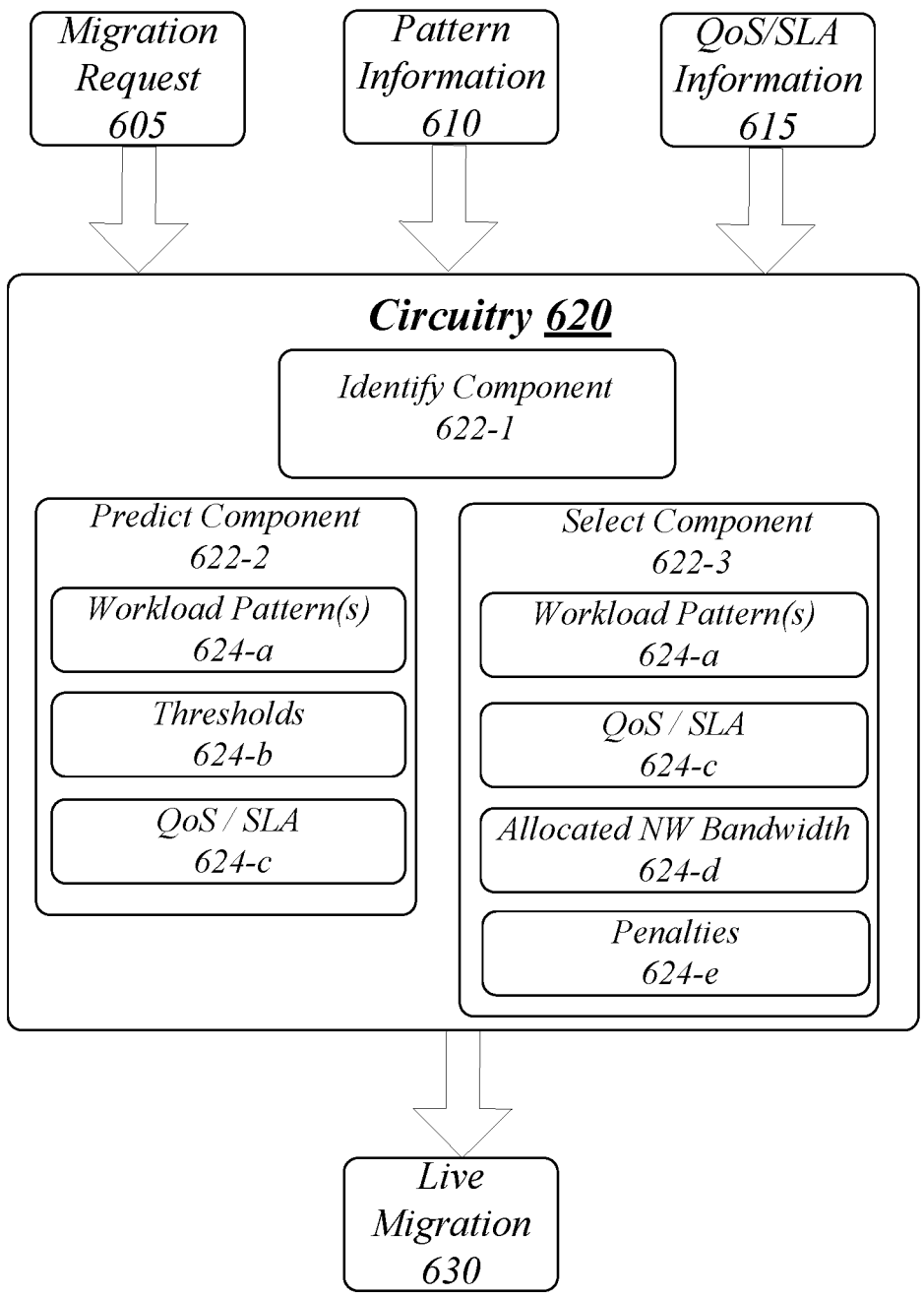
FIG. 6 illustrates an example block diagram for an apparatus.

FIG. 6 illustrates an example block diagram for an apparatus 600. Although apparatus 600 shown in FIG. 6 has a limited number of elements in a certain topology, it may be appreciated that the apparatus 600 may include more or less elements in alternate topologies as desired for a given implementation.

According to some examples, apparatus 600 may be supported by circuitry 620 maintained at a source node/server arranged to host a plurality of VMs. Circuitry 620 may be arranged to execute one or more software or firmware implemented modules or components 622-a. It is worthy to note that "a" and "b" and "c" and similar designators as used herein are intended to be variables representing any positive integer. Thus, for example, if an implementation sets a value for a=3, then a complete set of software or firmware for components 622-a may include components 622-1, 622-2 or 622-3. The examples presented are not limited in this context and the different variables used throughout may represent the same or different integer values. Also, these "components" may be software/firmware stored in computer-readable media, and although the components are shown in FIG. 6 as discrete boxes, this does not limit these components to storage in distinct computer-readable media components (e.g., a separate memory, etc.).

According to some examples, circuitry 620 may include a processor or processor circuitry to implement logic and/or features to facility migration of a VM for a source node/server to a destination node/server (e.g., migration manager 114). As mentioned above, circuitry 620 may be part of circuitry at a source node/server (e.g., source node/server 110) that may include processing cores or elements. The circuitry including one or more processing cores can be any of various commercially available processors, including without limitation an AMD® Athlon®, Duron® and Opteron® processors; ARM® application, embedded and secure processors; IBM® and Motorola® DragonBall® and PowerPC® processors; IBM and Sony® Cell processors; Intel® Atom®, Celeron®, Core (2) Duo®, Core i3, Core i5, Core i7, Itanium®, Pentium®, Xeon®, Xeon Phi® and XScale® processors; and similar processors. According to some examples circuitry 620 may also include an application specific integrated circuit (ASIC) and at least some components 622-a may be implemented as hardware elements of the ASIC.

According to some examples, apparatus 600 may include an identify component 622-1. Identify component 622-1 may be executed by circuitry 620 to identify a first VM from among a plurality of VMs hosted by a source node for live migration to a destination node, the plurality of VMs separately allocated source node network bandwidth for executing a respective application to fulfill a respective workload. For these examples, selection of the first VM may be made responsive to migration request 605 that indicates that the first VM may need to be migrated to another node (e.g., based on resource balancing).

In some examples, apparatus 600 may also include a predict component 622-2. Predict component 622-2 may be executed by circuitry 620 to determine a predicted time period for the first VM, executing a first application, to copy dirty memory pages to the destination node until a threshold number of remaining dirty memory pages falls below a threshold number, the predicted time period based on the first VM executing the first application to fulfill a first workload. For these examples, pattern information 610 and QoS/SLA information 615 may include information for predict component 622-2 to determine one or more workload patterns for the first VM and determine thresholds associated with the threshold number of remaining dirty pages in order to meet one or more QoS/SLA requirements and then maintain these determinations in workload pattern(s) 624-a, thresholds 624-b or QoS/SLA 624-c in a data structure such as a lookup table (LUT). This information may be used by predict component 622-2 to determine the predicted time period for the first VM. The predicted time, for examples, may be determined by predict component 622-2 using example equations (1) to (10) as mentioned above for FIGS. 1-4.

According to some examples, apparatus 600 may also include a select component 622-3. Select component 622-3 may be executed by circuitry 620 to select a second VM from among the plurality of VMs to borrow allocated source node network bandwidth for the first VM to fall below the threshold number within the predicted time period. For these examples, select component 622-3 may have access to the data structure that includes workload pattern(s) 624-a, thresholds 624-b or QoS/SLA 624-c for use in selecting the second VM. Select component 622-3 may also maintain allocated NW bandwidth 624-d and penalties 624-e (e.g., in a LUT) for use in determining that the second VM incurs the lowest penalty compared to the other VMs hosted by the source node/server that includes apparatus 600. Select component 622-3 may use example equations (11) and (12) as mentioned above for FIG. 5 to assist in selection of the second VM. Live migration 630 of the first VM may then occur using the borrowed allocated source node network bandwidth.

Included herein is a set of logic flows representative of example methodologies for performing novel aspects of the disclosed architecture. While, for purposes of simplicity of explanation, the one or more methodologies shown herein are shown and described as a series of acts, those skilled in the art will understand and appreciate that the methodologies are not limited by the order of acts. Some acts may, in accordance therewith, occur in a different order and/or concurrently with other acts from that shown and described herein. For example, those skilled in the art will understand and appreciate that a methodology could alternatively be represented as a series of interrelated states or events, such as in a state diagram. Moreover, not all acts illustrated in a methodology may be required for a novel implementation.

A logic flow may be implemented in software, firmware, and/or hardware. In software and firmware embodiments, a logic flow may be implemented by computer executable instructions stored on at least one non-transitory computer readable medium or machine readable medium, such as an optical, magnetic or semiconductor storage. The embodiments are not limited in this context.

FIG. 7 illustrates an example of a logic flow 700. Logic flow 700 may be representative of some or all of the operations executed by one or more logic, features, or devices described herein, such as apparatus 600. More particularly, logic flow 700 may be implemented by at least identify component 622-1, predict component 622-2 or select component 622-3.

According to some examples, logic flow 700 at block 702 may identify a first VM from among a plurality of VMs hosted by a source node for live migration to a destination node, the plurality of VMs separately allocated source node network bandwidth for executing a respective application to fulfill a respective workload. For these examples, identify component 622-1 may identify the first VM.

In some examples, logic flow 700 at block 704 may determine a predicted time period for the first VM, executing a first application, to copy dirty memory pages to the destination node until a threshold number of remaining dirty memory pages falls below a threshold number, the predicted time period based on the first VM executing the first application to fulfill a first workload. For these examples, predict component 622-2 may determine the predicted time period.

According to some examples, logic flow 700 at block 706 may select a second VM from among the plurality of VMs to borrow allocated source node network bandwidth for the first VM to fall below the threshold number within the predicted time period. For these examples, select component 622-3 may select the second VM.

FIG. 8 illustrates an example of a storage medium 800. Storage medium 800 may comprise an article of manufacture. In some examples, storage medium 800 may include any non-transitory computer readable medium or machine readable medium, such as an optical, magnetic or semiconductor storage. Storage medium 800 may store various types of computer executable instructions, such as instructions to implement logic flow 700. Examples of a computer readable or machine readable storage medium may include any tangible media capable of storing electronic data, including volatile memory or non-volatile memory, removable or non-removable memory, erasable or non-erasable memory, writeable or re-writeable memory, and so forth. Examples of computer executable instructions may include any suitable type of code, such as source code, compiled code, interpreted code, executable code, static code, dynamic code, object-oriented code, visual code, and the like. The examples are not limited in this context.

Figure 9:
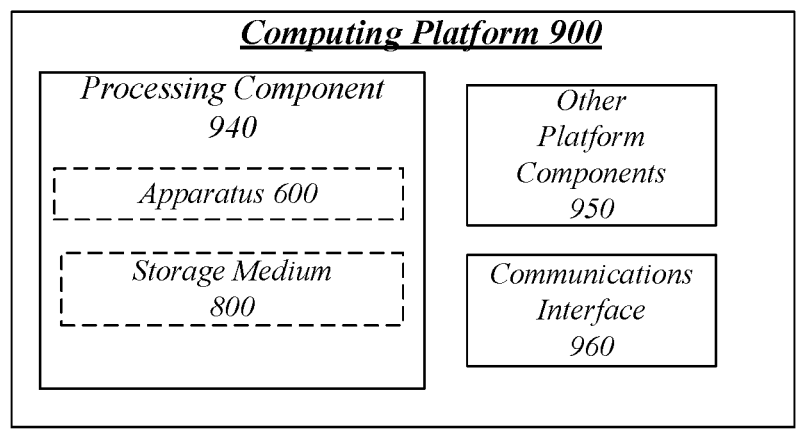
FIG. 9 illustrates an example computing platform.

FIG. 9 illustrates an example computing platform 900. In some examples, as shown in FIG. 9, computing platform 900 may include a processing component 940, other platform components 950 or a communications interface 960. According to some examples, computing platform 900 may be implemented in node/server. The node/server may be capable of coupling through a network to other nodes/servers and may be part of data center including a plurality of network connected nodes/servers arranged to host VMs.

According to some examples, processing component 940 may execute processing operations or logic for apparatus 600 and/or storage medium 800. Processing component 940 may include various hardware elements, software elements, or a combination of both. Examples of hardware elements may include devices, logic devices, components, processors, microprocessors, circuits, processor circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), memory units, logic gates, registers, semiconductor device, chips, microchips, chip sets, and so forth. Examples of software elements may include software components, programs, applications, computer programs, application programs, device drivers, system programs, software development programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an example is implemented using hardware elements and/or software elements may vary in accordance with any number of factors, such as desired computational rate, power levels, heat tolerances, processing cycle budget, input data rates, output data rates, memory resources, data bus speeds and other design or performance constraints, as desired for a given example.

In some examples, other platform components 950 may include common computing elements, such as one or more processors, multi-core processors, co-processors, memory units, chipsets, controllers, peripherals, interfaces, oscillators, timing devices, video cards, audio cards, multimedia input/output (I/O) components (e.g., digital displays), power supplies, and so forth. Examples of memory units may include without limitation various types of computer readable and machine readable storage media in the form of one or more higher speed memory units, such as read-only memory (ROM), random-access memory (RAM), dynamic RAM (DRAM), Double-Data-Rate DRAM (DDRAM), synchronous DRAM (SDRAM), static RAM (SRAM), programmable ROM (PROM), erasable programmable ROM (EPROM), electrically erasable programmable ROM (EEPROM), flash memory, polymer memory such as ferroelectric polymer memory, ovonic memory, phase change or ferroelectric memory, silicon-oxide-nitride-oxide-silicon (SONOS) memory, magnetic or optical cards, an array of devices such as Redundant Array of Independent Disks (RAID) drives, solid state memory devices (e.g., USB memory), solid state drives (SSD) and any other type of storage media suitable for storing information.

In some examples, communications interface 960 may include logic and/or features to support a communication interface. For these examples, communications interface 960 may include one or more communication interfaces that operate according to various communication protocols or standards to communicate over direct or network communication links or channels. Direct communications may occur via use of communication protocols or standards described in one or more industry standards (including progenies and variants) such as those associated with the PCIe specification. Network communications may occur via use of communication protocols or standards such those described in one or more Ethernet standards promulgated by IEEE. For example, one such Ethernet standard may include IEEE 802.3. Network communication may also occur according to one or more OpenFlow specifications such as the OpenFlow Hardware Abstraction API Specification.

As mentioned above computing platform 900 may be implemented in a server/node or client computing device. Accordingly, functions and/or specific configurations of computing platform 900 described herein, may be included or omitted in various embodiments of computing platform 900, as suitably desired for a server/node or client computing device.

The components and features of computing platform 900 may be implemented using any combination of discrete circuitry, application specific integrated circuits (ASICs), logic gates and/or single chip architectures. Further, the features of computing platform 900 may be implemented using microcontrollers, programmable logic arrays and/or microprocessors or any combination of the foregoing where suitably appropriate. It is noted that hardware, firmware and/or software elements may be collectively or individually referred to herein as "logic" or "circuit."

It should be appreciated that the exemplary computing platform 900 shown in the block diagram of FIG. 9 may represent one functionally descriptive example of many potential implementations. Accordingly, division, omission or inclusion of block functions depicted in the accompanying figures does not infer that the hardware components, circuits, software and/or elements for implementing these functions would necessarily be divided, omitted, or included in embodiments.

One or more aspects of at least one example may be implemented by representative instructions stored on at least one machine-readable medium which represents various logic within the processor, which when read by a machine, computing device or system causes the machine, computing device or system to fabricate logic to perform the techniques described herein. Such representations, known as "IP cores" may be stored on a tangible, machine readable medium and supplied to various customers or manufacturing facilities to load into the fabrication machines that actually make the logic or processor.

Various examples may be implemented using hardware elements, software elements, or a combination of both. In some examples, hardware elements may include devices, components, processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), memory units, logic gates, registers, semiconductor device, chips, microchips, chip sets, and so forth. In some examples, software elements may include software components, programs, applications, computer programs, application programs, system programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an example is implemented using hardware elements and/or software elements may vary in accordance with any number of factors, such as desired computational rate, power levels, heat tolerances, processing cycle budget, input data rates, output data rates, memory resources, data bus speeds and other design or performance constraints, as desired for a given implementation.

Some examples may include an article of manufacture or at least one computer-readable medium. A computer-readable medium may include a non-transitory storage medium to store logic. In some examples, the non-transitory storage medium may include one or more types of computer-readable storage media capable of storing electronic data, including volatile memory or non-volatile memory, removable or non-removable memory, erasable or non-erasable memory, writeable or re-writeable memory, and so forth. In some examples, the logic may include various software elements, such as software components, programs, applications, computer programs, application programs, system programs, machine programs, operating system software, middleware, firmware, software modules, routines, subroutines, functions, methods, procedures, software interfaces, API, instruction sets, computing code, computer code, code segments, computer code segments, words, values, symbols, or any combination thereof.

According to some examples, a computer-readable medium may include a non-transitory storage medium to store or maintain instructions that when executed by a machine, computing device or system, cause the machine, computing device or system to perform methods and/or operations in accordance with the described examples. The instructions may include any suitable type of code, such as source code, compiled code, interpreted code, executable code, static code, dynamic code, and the like. The instructions may be implemented according to a predefined computer language, manner or syntax, for instructing a machine, computing device or system to perform a certain function. The instructions may be implemented using any suitable high-level, low-level, object-oriented, visual, compiled and/or interpreted programming language.

Some examples may be described using the expression "in one example" or "an example" along with their derivatives. These terms mean that a particular feature, structure, or characteristic described in connection with the example is included in at least one example. The appearances of the phrase "in one example" in various places in the specification are not necessarily all referring to the same example.

Some examples may be described using the expression "coupled" and "connected" along with their derivatives. These terms are not necessarily intended as synonyms for each other. For example, descriptions using the terms "connected" and/or "coupled" may indicate that two or more elements are in direct physical or electrical contact with each other. The term "coupled," however, may also mean that two or more elements are not in direct contact with each other, but yet still co-operate or interact with each other.

The follow examples pertain to additional examples of technologies disclosed herein.

Example 1

An example apparatus may include circuitry. The apparatus may also include an identify component for execution by the circuitry to identify a first VM from among a plurality of VMs hosted by a source node for live migration to a destination node. The plurality of VMs may be separately allocated source node network bandwidth for executing a respective application to fulfill a respective workload. The apparatus may also include a prediction component for execution by the circuitry to determine a predicted time period for the first VM, executing a first application, to copy dirty memory pages to the destination node until a threshold number of remaining dirty memory pages falls below a threshold number. The predicted time period may be based on the first VM executing the first application to fulfill a first workload. The apparatus may also include a select component for execution by the circuitry to select a second VM from among the plurality of VMs to borrow allocated source node network bandwidth for the first VM to fall below the threshold number within the predicted time period.

Example 2

The apparatus of example 1, the threshold number may be based on an ability of the source node to copy to the destination node remaining dirty memory pages and copy at least processor and input/output states for the first VM to execute the first application to fulfill the first workload within a shutdown time threshold using a first allocated source node bandwidth for the live migration.

Example 3

The apparatus of example 2, the first allocated source node network bandwidth and the borrowed allocated source node network bandwidth may be the same.

Example 4

The apparatus of example 2, the first allocated source node network bandwidth of the live migration may include a first portion from pre-allocated source node network bandwidth reserved for live migration and a second portion from the borrowed allocated source node network bandwidth.

Example 5

The apparatus of example 2, the shutdown time threshold may be based on a requirement for the first VM to stop executing the first application at the source node and begin executing the first application at the destination node within a given time period, the requirement set for meeting one or more QoS criteria or an SLA.

Example 6

The apparatus of example 2, the first workload may have a workload pattern for the first VM to execute the application that indicates a rate of dirty page generation. For these examples, the workload pattern may be used by the prediction component to determine how many copy iterations are needed to copy dirty memory pages to the source node given the first allocated source node bandwidth for the live migration until remaining dirty memory pages falls below the threshold.

Example 7

The apparatus of example 1, the select component to select the second VM may include the select component to determine individual penalties to each of the plurality of VMs, excluding the first VM, for providing the borrowed allocated source node network bandwidth. The select component may also compare the individual penalties and determine that the second VM has a lowest penalty for providing the borrowed allocated source node bandwidth based on the comparison.

Example 8

The apparatus of example 1, the select component to select the second VM may include the select component to select the second VM based on the second VM not subject to a requirement for meeting one or more QoS criteria or an SLA.

Example 9

The apparatus of example 1, the source node and the destination node may be included in a data center arranged to provide Iaas, PaaS or SaaS.

Example 10

The apparatus of example 1 may also include a digital display coupled to the circuitry to present a user interface view.

Example 11

An example method may include identifying, at a processor circuit, a first VM from among a plurality of VMs hosted by a source node for live migration to a destination node, the plurality of VMs separately allocated source node network bandwidth for executing a respective application to fulfill a respective workload. The method may also include determining a predicted time period for the first VM, executing a first application, to copy dirty memory pages to the destination node until a threshold number of remaining dirty memory pages falls below a threshold number. The predicted time period may be based on the first VM executing the first application to fulfill a first workload. The method may also include selecting a second VM from among the plurality of VMs to borrow allocated source node network bandwidth for the first VM to fall below the threshold number within the predicted time period.

Example 12

The method of example 11, the threshold number may be based on an ability of the source node to copy to the destination node remaining dirty memory pages and copy at least processor and input/output states for the first VM to execute the first application to fulfill the first workload within a shutdown time threshold using a first allocated source node bandwidth for the live migration.

Example 13

The method of example 12, comprising the first allocated source node network bandwidth and the borrowed allocated source node network bandwidth are the same.

Example 14

The method of example 12, the first allocated source node network bandwidth of the live migration may include a first portion from pre-allocated source node network bandwidth reserved for live migration and a second portion from the borrowed allocated source node network bandwidth.

Example 15

The method of example 12, the shutdown time threshold may be based on a requirement for the first VM to stop executing the first application at the source node and begin executing the first application at the destination node within a given time period, the requirement set for meeting one or more QoS criteria or an SLA.

Example 16

The method of example 12, the first workload may have a workload pattern for the first VM to execute the application that indicates a rate of dirty page generation. For these examples, the workload pattern may be used to determine how many copy iterations are needed to copy dirty memory pages to the source node given the first allocated source node bandwidth for the live migration until remaining dirty memory pages falls below the threshold.

Example 17

The method of example 11, selecting the second VM ma be based on determining individual penalties to each of the plurality of VMs, excluding the first VM, for providing the borrowed allocated source node network bandwidth. Selecting the second VM may also be based on comparing the individual penalties and determining that the second VM has a lowest penalty for providing the borrowed allocated source node bandwidth based on the comparison.

Example 18

The method of example 11, selecting the second VM based on the second VM not subject to a requirement for meeting one or more QoS criteria or an SLA.

Example 19

The method of example 11, the source node and the destination node may be included in a data center arranged to provide Iaas, PaaS or SaaS.

Example 20

An example at least one machine readable medium may include a plurality of instructions that in response to being executed by system at a computing platform may cause the system to carry out a method according to any one of examples 11 to 19.

Example 21

An apparatus may include means for performing the methods of any one of examples 11 to 19.

Example 22

An example at least one machine readable medium may include a plurality of instructions that in response to being executed by a system may cause the system to identify a first VM from among a plurality of VMs hosted by a source node for live migration to a destination node. The plurality of VMs may be separately allocated source node network bandwidth for executing a respective application to fulfill a respective workload. The instructions may also cause the system to determine a predicted time period for the first VM, executing a first application, to copy dirty memory pages to the destination node until a threshold number of remaining dirty memory pages falls below a threshold number. The predicted time period may be based on the first VM executing the first application to fulfill a first workload. The instructions may also cause the system to select a second VM from among the plurality of VMs to borrow allocated source node network bandwidth for the first VM to fall below the threshold number within the predicted time period.

Example 23

The at least one machine readable medium of example 22, the threshold number may be based on an ability of the source node to copy to the destination node remaining dirty memory pages and copy at least processor and input/output states for the first VM to execute the first application to fulfill the first workload within a shutdown time threshold using a first allocated source node bandwidth for the live migration.

Example 24

The at least one machine readable medium of example 23, the first allocated source node network bandwidth and the borrowed allocated source node network bandwidth may be the same.

Example 25

The at least one machine readable medium of example 23, the first allocated source node network bandwidth of the live migration may include a first portion from pre-allocated source node network bandwidth reserved for live migration and a second portion from the borrowed allocated source node network bandwidth.

Example 26

The at least one machine readable medium of example 23, the shutdown time threshold may be based on a requirement for the first VM to stop executing the first application at the source node and begin executing the first application at the destination node within a given time period, the requirement set for meeting one or more QoS criteria or an SLA.

Example 27

The at least one machine readable medium of example 23, the first workload may have a workload pattern for the first VM to execute the application that indicates a rate of dirty page generation. For these examples, the workload pattern may be used to determine how many copy iterations are needed to copy dirty memory pages to the source node given the first allocated source node bandwidth for the live migration until remaining dirty memory pages falls below the threshold.

Example 28

The at least one machine readable medium of example 22, the instructions to cause the system to select the second VM may include the instructions to further cause the system to determine individual penalties to each of the plurality of VMs, excluding the first VM, for providing the borrowed allocated source node network bandwidth. The instructions may also cause the system to compare the individual penalties and determine that the second VM has a lowest penalty for providing the borrowed allocated source node bandwidth based on the comparison.

Example 29

The at least one machine readable medium of example 22, the instructions to cause the system to select the second VM may be based on the second VM not being subject to a requirement for meeting one or more QoS criteria or an SLA.

Example 30

The at least one machine readable medium of example 22, the source node and the destination node may be included in a data center arranged to provide Iaas, PaaS or SaaS.

It is emphasized that the Abstract of the Disclosure is provided to comply with 37 C.F.R. Section 1.72(b), requiring an abstract that will allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single example for the purpose of streamlining the disclosure. This method of disclosure is not to be interpreted as reflecting an intention that the claimed examples require more features than are expressly recited in each claim. Rather, as the following claims reflect, inventive subject matter lies in less than all features of a single disclosed example. Thus the following claims are hereby incorporated into the Detailed Description, with each claim standing on its own as a separate example. In the appended claims, the terms "including" and "in which" are used as the plain-English equivalents of the respective terms "comprising" and "wherein," respectively. Moreover, the terms "first," "second," "third," and so forth, are used merely as labels, and are not intended to impose numerical requirements on their objects.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. An apparatus comprising:
   circuitry;
   an identify component for execution by the circuitry to identify a first virtual machine (VM) from among a plurality of VMs hosted by a source node for live migration to a destination node, the plurality of VMs separately allocated source node network bandwidth for executing a respective application to fulfill a respective workload;
   a prediction component for execution by the circuitry to determine a predicted time period for the first VM, executing a first application, to copy dirty memory pages to the destination node until a number of remaining dirty memory pages falls below a threshold number, the predicted time period based on the first VM executing the first application to fulfill a first workload; and
   a select component for execution by the circuitry to select a second VM from among the plurality of VMs to borrow allocated source node network bandwidth for the first VM to fall below the threshold number within the predicted time period.

2. The apparatus of claim 1, the threshold number is based on an ability of the source node to copy to the destination node remaining dirty memory pages and copy at least processor and input/output states for the first VM to execute the first application to fulfill the first workload within a shutdown time threshold using a first allocated source node bandwidth for the live migration.

3. The apparatus of claim 2, comprising the first allocated source node network bandwidth and the borrowed allocated source node network bandwidth are the same.

4. The apparatus of claim 2, comprising the first allocated source node network bandwidth of the live migration including a first portion from pre-allocated source node network bandwidth reserved for live migration and a second portion from the borrowed allocated source node network bandwidth.

5. The apparatus of claim 2, comprising the shutdown time threshold based on a requirement for the first VM to stop executing the first application at the source node and begin executing the first application at the destination node within a given time period, the requirement set for meeting one or more quality of service (QoS) criteria or a service level agreement (SLA).

6. The apparatus of claim 2, comprising the first workload having a workload pattern for the first VM to execute the application that indicates a rate of dirty page generation, the workload pattern used by the prediction component to determine how many copy iterations are needed to copy dirty memory pages to the source node given the first allocated source node bandwidth for the live migration until remaining dirty memory pages falls below the threshold.

7. The apparatus of claim 1, the select component to select the second VM comprises the select component to:
determine individual penalties to each of the plurality of VMs, excluding the first VM, for providing the borrowed allocated source node network bandwidth;
compare the individual penalties; and
determine that the second VM has a lowest penalty for providing the borrowed allocated source node bandwidth based on the comparison.

8. The apparatus of claim 1, the select component to select the second VM comprises the select component to select the second VM based on the second VM not subject to a requirement for meeting one or more quality of service (QoS) criteria or a service level agreement (SLA).

9. The apparatus of claim 1, comprising the source node and the destination node included in a data center arranged to provide Infrastructure as a Service (IaaS), Platform as a Service (PaaS) or Software as a Service (SaaS).

10. The apparatus of claim 1, comprising a digital display coupled to the circuitry to present a user interface view.

11. A method comprising:
identifying, at a processor circuit, a first virtual machine (VM) from among a plurality of VMs hosted by a source node for live migration to a destination node, the plurality of VMs separately allocated source node network bandwidth for executing a respective application to fulfill a respective workload;
determining a predicted time period for the first VM, executing a first application, to copy dirty memory pages to the destination node until a number of remaining dirty memory pages falls below a threshold number, the predicted time period based on the first VM executing the first application to fulfill a first workload; and
selecting a second VM from among the plurality of VMs to borrow allocated source node network bandwidth for the first VM to fall below the threshold number within the predicted time period.

12. The method of claim 11, the threshold number is based on an ability of the source node to copy to the destination node remaining dirty memory pages and copy at least processor and input/output states for the first VM to execute the first application to fulfill the first workload within a shutdown time threshold using a first allocated source node bandwidth for the live migration.

13. The method of claim 12, comprising the first allocated source node network bandwidth of the live migration including a first portion from pre-allocated source node network bandwidth reserved for live migration and a second portion from the borrowed allocated source node network bandwidth.

14. The method of claim 12, comprising the shutdown time threshold based on a requirement for the first VM to stop executing the first application at the source node and begin executing the first application at the destination node within a given time period, the requirement set for meeting one or more quality of service (QoS) criteria or a service level agreement (SLA).

15. The method of claim 12, comprising the first workload having a workload pattern for the first VM to execute the application that indicates a rate of dirty page generation, the workload pattern used to determine how many copy iterations are needed to copy dirty memory pages to the source node given the first allocated source node bandwidth for the live migration until remaining dirty memory pages falls below the threshold.

16. The method of claim 11, comprising selecting the second VM based on:

determining individual penalties to each of the plurality of VMs, excluding the first VM, for providing the borrowed allocated source node network bandwidth;
comparing the individual penalties; and
determining that the second VM has a lowest penalty for providing the borrowed allocated source node bandwidth based on the comparison.

17. At least one non-transitory machine readable medium comprising a plurality of instructions that in response to being executed by a system cause the system to:
identify a first virtual machine (VM) from among a plurality of VMs hosted by a source node for live migration to a destination node, the plurality of VMs separately allocated source node network bandwidth for executing a respective application to fulfill a respective workload;
determine a predicted time period for the first VM, executing a first application, to copy dirty memory pages to the destination node until a number of remaining dirty memory pages falls below a threshold number, the predicted time period based on the first VM executing the first application to fulfill a first workload; and
select a second VM from among the plurality of VMs to borrow allocated source node network bandwidth for the first VM to fall below the threshold number within the predicted time period.

18. The at least one machine readable medium of claim 17, the threshold number is based on an ability of the source node to copy to the destination node remaining dirty memory pages and copy at least processor and input/output states for the first VM to execute the first application to fulfill the first workload within a shutdown time threshold using a first allocated source node bandwidth for the live migration.

19. The at least one machine readable medium of claim 18, comprising the first allocated source node network bandwidth and the borrowed allocated source node network bandwidth are the same.

20. The at least one machine readable medium of claim 18, comprising the first allocated source node network bandwidth of the live migration including a first portion from pre-allocated source node network bandwidth reserved for live migration and a second portion from the borrowed allocated source node network bandwidth.

21. The at least one machine readable medium of claim 18, comprising the shutdown time threshold based on a requirement for the first VM to stop executing the first application at the source node and begin executing the first application at the destination node within a given time period, the requirement set for meeting one or more quality of service (QoS) criteria or a service level agreement (SLA).

22. The at least one machine readable medium of claim 18, the first workload having a workload pattern for the first VM to execute the application that indicates a rate of dirty page generation, the workload pattern used to determine how many copy iterations are needed to copy dirty memory pages to the source node given the first allocated source node bandwidth for the live migration until remaining dirty memory pages falls below the threshold.

23. The at least one machine readable medium of claim 17, the instructions to cause the system to select the second VM comprises the instructions to further cause the system to:
determine individual penalties to each of the plurality of VMs, excluding the first VM, for providing the borrowed allocated source node network bandwidth;
compare the individual penalties; and determine that the second VM has a lowest penalty for providing the borrowed allocated source node bandwidth based on the comparison.

24. The at least one machine readable medium of claim 17, the instructions to cause the system to select the second VM based on the second VM not being subject to a requirement for meeting one or more quality of service (QoS) criteria or a service level agreement (SLA).

25. The at least one machine readable medium of claim 17, comprising the source node and the destination node included in a data center arranged to provide Infrastructure as a Service (IaaS), Platform as a Service (PaaS) or Software as a Service (SaaS).

* * * * *